US010069951B2

(12) United States Patent
Enojado (10) Patent No.: US 10,069,951 B2
(45) Date of Patent: Sep. 4, 2018

(54) MOBILE PHONE CASE APPARATUS AND SYSTEM (71) Applicant: Arne Enojado, Herndon, VA (US)

(72) Inventor: Arne Enojado, Herndon, VA (US)

(*) Notice: Subject to any disclaimer, the term of this patent is extended or adjusted under 35 U.S.C. 154(b) by 0 days.

(21) Appl. No.: 15/621,070

(22) Filed: Jun. 13, 2017

(65) Prior Publication Data
US 2017/0359452 A1 Dec. 14, 2017

Related U.S. Application Data (60) Provisional application No. 62/349,167, filed on Jun. 13, 2016.

(51) Int. Cl.
H04M 1/00 (2006.01)
H04M 1/02 (2006.01)
H04M 1/04 (2006.01)
A45C 11/00 (2006.01)
A45F 5/00 (2006.01)
A45C 13/30 (2006.01)
A45F 3/14 (2006.01)
H04B 1/3888 (2015.01)
H04M 1/15 (2006.01)
H02J 7/00 (2006.01)
H04B 1/3827 (2015.01)
H04M 1/18 (2006.01)

(52) U.S. Cl.
CPC .......... *H04M 1/0202* (2013.01); *A45C 11/00* (2013.01); *A45C 13/30* (2013.01); *A45F 3/14* (2013.01); *A45F 5/00* (2013.01); *A45F 5/004* (2013.01); *H04B 1/3888* (2013.01); *H04M 1/04* (2013.01); *H04M 1/15* (2013.01); *A45C 2011/002* (2013.01); *A45F 2005/006* (2013.01); *A45F 2005/008* (2013.01); *A45F 2200/0516* (2013.01); *H02J 7/0044* (2013.01); *H04B 2001/3855* (2013.01); *H04M 1/185* (2013.01)

(58) Field of Classification Search
CPC ............................... H04M 1/15; H04M 1/022
USPC ............... 455/475.1, 575.2, 575.8, 348, 100; 224/162, 191, 396; 191/12.4; 361/755
See application file for complete search history.

(56) References Cited

U.S. PATENT DOCUMENTS

| 6,273,354 B1 | 8/2001 | Kovacik et al. |
| 6,731,956 B2 | 5/2004 | Hanna et al. |
| 8,485,404 B2 | 7/2013 | Monaco et al. |
| 8,783,531 B2 | 7/2014 | Kroupa |
| 8,800,907 B2 * | 8/2014 | Koenig ............... H04R 1/1033 191/12.4 |
| 8,988,043 B2 | 3/2015 | Alammari |
| 9,066,181 B2 | 6/2015 | Kroupa |
| 9,237,396 B2 | 1/2016 | Kroupa |
| 9,247,035 B1 | 1/2016 | Zhang |

(Continued)

Primary Examiner — Golam Sorowar
Assistant Examiner — Max Mathew
(74) Attorney, Agent, or Firm — Maier & Maier, PLLC (57) ABSTRACT A mobile phone case. A charging cable or an audio cable, or a combination thereof, can be stored within the mobile phone case and deployed outward as desired. Alternatively, the cable can provide the added utility of mounting, hanging, and tying capabilities for attachment of the mobile phone case onto certain physical objects or the human body. Furthermore, the mobile phone case may provide multiple anchor points to create a rigging system with the cable that forms various suspension configurations for a desired location.

15 Claims, 6 Drawing Sheets (56) References Cited

U.S. PATENT DOCUMENTS

| | | | |
|---|---|---|---|
| 9,654,606 B1* | 5/2017 | Warren | H02G 11/02 |
| 2001/0035242 A1 | 11/2001 | Hughs et al. | |
| 2002/0193151 A1 | 12/2002 | Edreich | |
| 2003/0157973 A1 | 8/2003 | Yang | |
| 2004/0204165 A1 | 10/2004 | Huang | |
| 2008/0009329 A1 | 1/2008 | Adler | |
| 2011/0203954 A1* | 8/2011 | Kroupa | B65H 75/4431 |
| | | | 206/320 |
| 2013/0029725 A1* | 1/2013 | Heil-Brice | H04M 1/0258 |
| | | | 455/557 |
| 2014/0253038 A1 | 9/2014 | Posa | |
| 2015/0331448 A1* | 11/2015 | Truong | G06F 1/1616 |
| | | | 455/575.8 |
| 2015/0364875 A1* | 12/2015 | Ginsberg | H01R 13/72 |
| | | | 320/114 |
| 2016/0191760 A1* | 6/2016 | Wu | H04N 5/2251 |
| | | | 348/262 |
| 2016/0209885 A1* | 7/2016 | Ellis | H01R 31/065 |
| 2016/0241290 A1* | 8/2016 | Alshammari | H04B 1/3888 |

* cited by examiner

MOBILE PHONE CASE APPARATUS AND SYSTEM

CROSS REFERENCE TO RELATED APPLICATIONS

This application claims priority from U.S. Provisional Patent Application Ser. No. 62/349,167, filed Jun. 13, 2016, the entire contents of which are hereby incorporated by reference.

BACKGROUND

Portable handheld electronics, such as mobile phones, are widely used in our daily lives. It is well known that mobile phones have components which are easily damaged when the mobile phones drop or suffer impacts. Thus, many people choose to use mobile phone cases to protect their mobile phones. Currently, most of the mobile phone cases merely serve as covers.

Additionally, with the advent of smart phones, mobile phones now serve as communication and entertainment devices. As such, audio outputs, often using corded headphones or ear buds, are used with phones. Such audio outputs can provide a number of challenges, such as the burden of carrying them, entanglement of cords, or loss of the devices themselves. Further, because mobile phones are used so frequently, issues including battery life depletion and the need to charge the phone's battery frequently arise. Solving these issues requires an additional cord that must be plugged into the phone as well as a power supply. This introduces another cord which a user would have to carry, which could become entangled or otherwise inconvenience the user, and which is easy to lose.

SUMMARY

Exemplary embodiments described herein generally relate to a mobile phone case and, more specifically, to cable management and utilization functions integrated into the case. The cable can provide the added utility of mounting, hanging, and tying capabilities for attachment of the case onto certain physical objects or the human body.

Such a mobile phone case may include: a case that covers a portable device; at least one cable that is stored within the case and passes outward through at least one opening of the case; and a plurality of anchor points that are provided on a plurality of outer edges of the case. According to an exemplary embodiment, the first end of the at least one cable is connected to the portable device when the portable device is loaded into the case, at least one of an electricity and an electrical signal is transferred via the at least one cable, and the at least one cable is linked on the plurality of anchor points forming a loop of the at least one cable. Also, in an exemplary embodiment, the cables may be a charging cable or an audio cable, or a combination thereof which can be stored within the mobile phone case and extended outward as desired.

BRIEF DESCRIPTION OF THE DRAWINGS

Advantages of embodiments of the present invention may be apparent from the following detailed description of the exemplary embodiments. The following detailed description should be considered in conjunction with the accompanying Figures in which.

DETAILED DESCRIPTION

Aspects of the present invention are disclosed in the following description and related Figures directed to specific embodiments of the invention. Those skilled in the art may recognize that alternate embodiments may be devised without departing from the spirit or the scope of the claims. Additionally, well-known elements of exemplary embodiments of the invention may not be described in detail or may be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Generally referring to the figures and specification, various exemplary embodiments of a system and apparatus for carrying and protecting a mobile phone may be shown and described.

Figure 1:
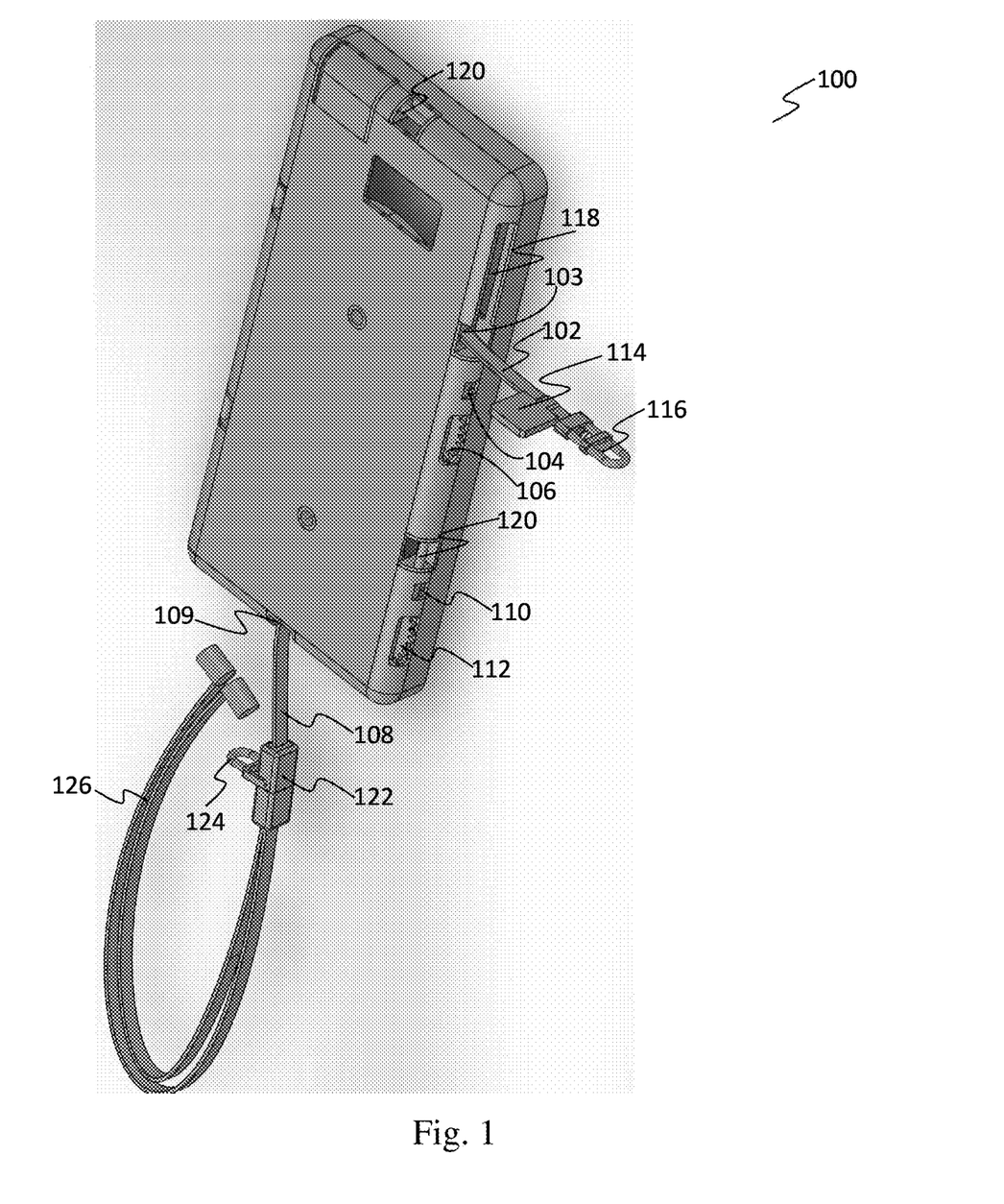
FIG. 1 is a diagram showing a back view of a mobile phone case according to an exemplary embodiment.

In an exemplary embodiment as illustrated in FIG. 1, a mobile phone case 100 can provide a charging cable 102. The charging cable 102 can be stored within the mobile phone case 100 and retracted outward through an opening 103 residing at one side of the mobile phone case 100. The charging cable 102 can be a flat wire, round wire or half-round wire as desired. As shown in FIG. 1, the end of the charging cable 102 can be equipped with a male USB connector 114. The male USB connector 114 can be connected to an electrical outlet adapter to charge the phone covered by the mobile phone case 100. Alternatively, the male USB connector 114 can be connected to other electronic devices, such as desktop computer, laptop, or the like, to transfer data between the phone covered by the mobile phone case 100 and the other electronic devices.

In another exemplary embodiment, a carabiner 116 can be provided at the end of the charging cable 102 adjacent to the male USB connector 114, and may slot into receiving area 118. The carabiner 116 can be, for example, a metal loop with a spring-loaded gate. It should be appreciated that the carabiner can be implemented with various shapes and locking mechanisms. The carabiner 116 can be used to attach the mobile phone case 100 to anchor points of other objects for the purpose of coupling, hanging or attaching. In order to bear sufficient weight, the charging cable 102 can be engineered to be more durable. For example, the cords can be made of elastic materials such as fiber cores. In a further embodiment, the mobile phone case 100 can have one or more anchor points 120. The anchor points can be set at any outer edge of the case shell as appropriate. The carabiner 116 may attach to the anchor points strategically for weight distribution and balance, as an example.

Now the mechanism for storing the charging cable 102 will be discussed with reference to exemplary FIG. 2. In an exemplary embodiment, a spool 202 may be arranged approximately at the center of the case 100 on an inner frame 210 that presses onto the phone's back. The spool 202 can attach to a gear 204. The gear 204 may join with a gear 106 to act as a winch. The gears 204 and 106 may be also attached to the inner frame 210 on the side not touching the phone. The gear 106 can protrude slightly from the side edge of the case 100 through an opening as illustrated in FIG. 1, which may allow the user to spin it for example by sliding back and forth with finger. As a result, the user can easily coil the charging cable 102 onto the spool 202 or uncoil it. In another exemplary embodiment, the gear 106 may have an adjacent ratcheting pawl 104 protruding from the side edge of the case 100 as shown in FIG. 1. The ratcheting pawl 104 can be engaged or disengaged manually to allow free spin or controlled tension for slacking or tightening purposes.

It should be appreciated that the above coiling mechanism is set forth by way of example; any other suitable implementing manner is applicable to the present disclosure. For example, instead of mechanical tensioner, a motorized gear can be used to coil the cable 102.

In an exemplary embodiment, the mobile phone case 100 can provide an audio cable 108 as illustrated in FIG. 1. Similar to the charging cable 102, the audio cable 108 can be stored within the mobile phone case 100 and extended outward through an opening 109 located at the bottom of the mobile phone case 100. The audio cable 108 can be a flat wire, round wire or half-round wire as desired. As shown in FIG. 1, the end of the audio cable 108 can be equipped with a female audio jack connector 122. The connector 122 can be connected to the user's headphone or earphone 126 for audio signal transmission. In another exemplary embodiment, a swivel carabiner 124 can be mounted to the connector 122. The swivel carabiner 124 can attach to an anchor point to prevent the connector from any undesired movement, for example.

The mechanism for storing the audio cable 108 can be similar to that for the charging cable 114 as discussed above. As illustrated in exemplary FIG. 2, a spool 206 can be arranged near the bottom of the case 100 on the inner frame 210. The spool 206 may be located on the same plane with the spool 202 but may not overlap it. The spool 206 may attach to a gear 208, and the gear 208 may join with a gear 112 to act as a winch. The gear 112 may protrude slightly from the side edge of the case 100 through an opening as illustrated in exemplary FIG. 1, which can allow the user to spin the gear 112 so as to coil the audio cable 108 onto the spool 206 or uncoil it. In another exemplary embodiment, the gear 112 may have an adjacent ratcheting pawl 110, which can be engaged or disengaged manually to allow free spin or controlled tension for slacking or tightening purposes.

In a further exemplary embodiment, a camera shutter button can be provided near the end of the charging cable 102. The shutter button can electronically communicate with the mobile phone housed by the case 100 through the charging cable 102. Alternatively, the shutter button can wirelessly communicate with the mobile phone, for example, via a Bluetooth network. When the shutter button is pressed, a signal indicating the pressing action is transmitted to the mobile phone, thereby triggering the camera shutter of the mobile phone to take photos. Since the charging cable 102 is scalable, it allows the user to take photos or "selfies" from desired farther distances while the mobile phone is mounted or stationary. Alternatively, the camera shutter button can be set near the end of the audio cable 108. As such, the shutter button may communicate with the mobile phone through the audio cable 108, for example. Further, various aspects of the cables, such as carabiners and actuators, may have a combined function of securing the case 100 in a desired fashion as well actuating a camera shutter.

Figure 2:
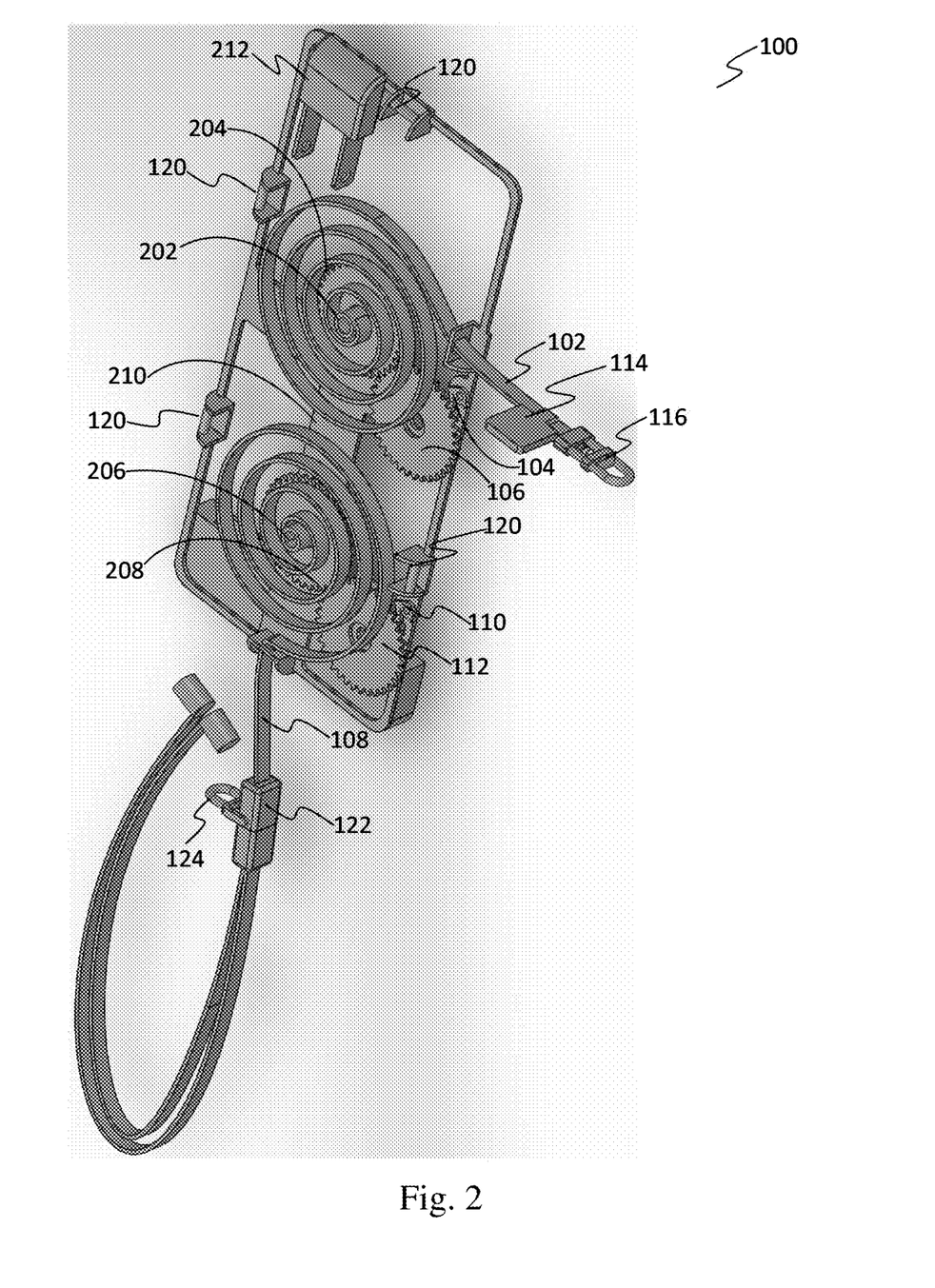
FIG. 2 is a diagram showing a perspective view of internal components of a mobile phone case according to an exemplary embodiment.

In another exemplary embodiment, an electrical wall outlet adapter 212 with an USB interface can be included at a hollow section corner of the case 100 as illustrated in FIG. 2. It can be detached from the mobile phone case 100 and plugged into an electrical outlet. As such, the USB connector 114 of the case 100 can be connected to the electrical outlet adapter 212 to charge the phone covered by the case 100.

Figure 3:
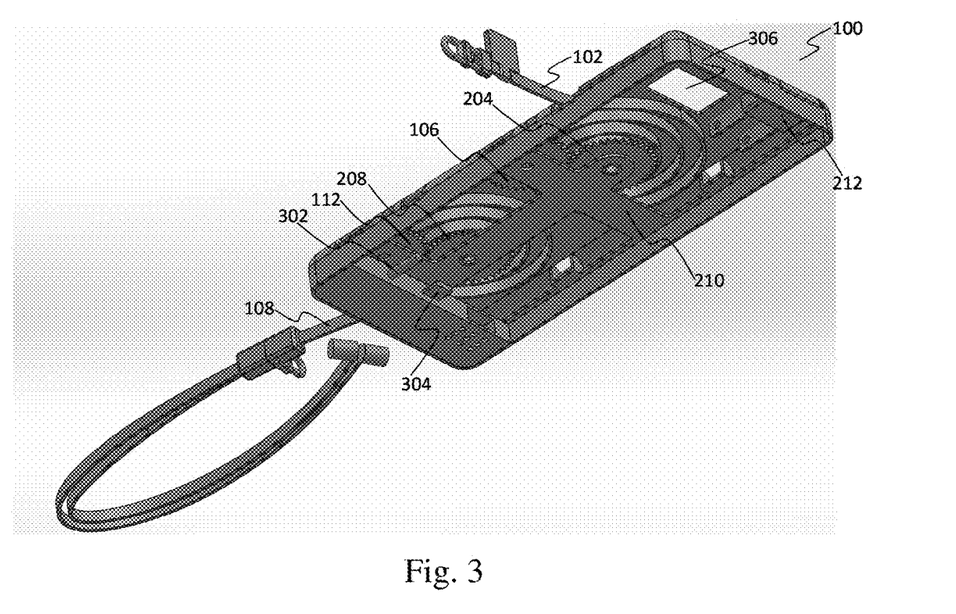
FIG. 3 is a diagram showing a front view of internal components of a mobile phone case according to an exemplary embodiment.

In an exemplary embodiment as illustrated in FIG. 3, the mobile phone case 100 can provide a male audio jack connector 302 and a male charging connector 304 at the bottom or any desired location of the case. The male audio jack connector 302 can be electrically connected with the audio cable 108. The male charging connector 304 can be electrically connected with the charging cable 102. When a mobile phone is loaded into the mobile phone case 100, the male audio jack connector 302 can be coupled with the headset jack of the mobile phone, and the male charging connector 304 can be coupled with the charging port of the mobile phone. Furthermore, the mobile phone case 100 can provide a window 306 on the back of the case to expose the camera lens of the mobile phone. In another exemplary embodiment, additional windows can be provided on the mobile phone case 100 for other functions of the mobile phone, such as a display screen.

Figure 4:
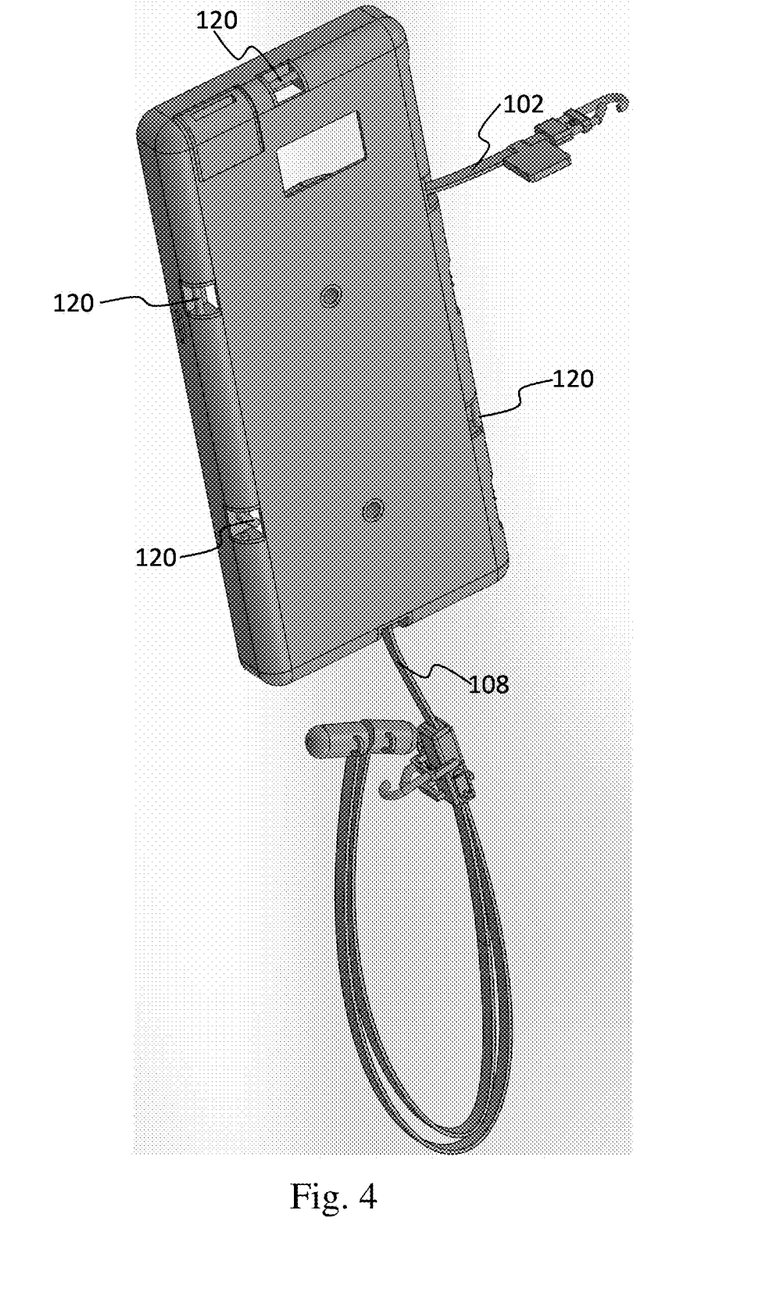
FIG. 4 is a diagram showing a back view of a mobile phone case according to an exemplary embodiment.
Figure 5:
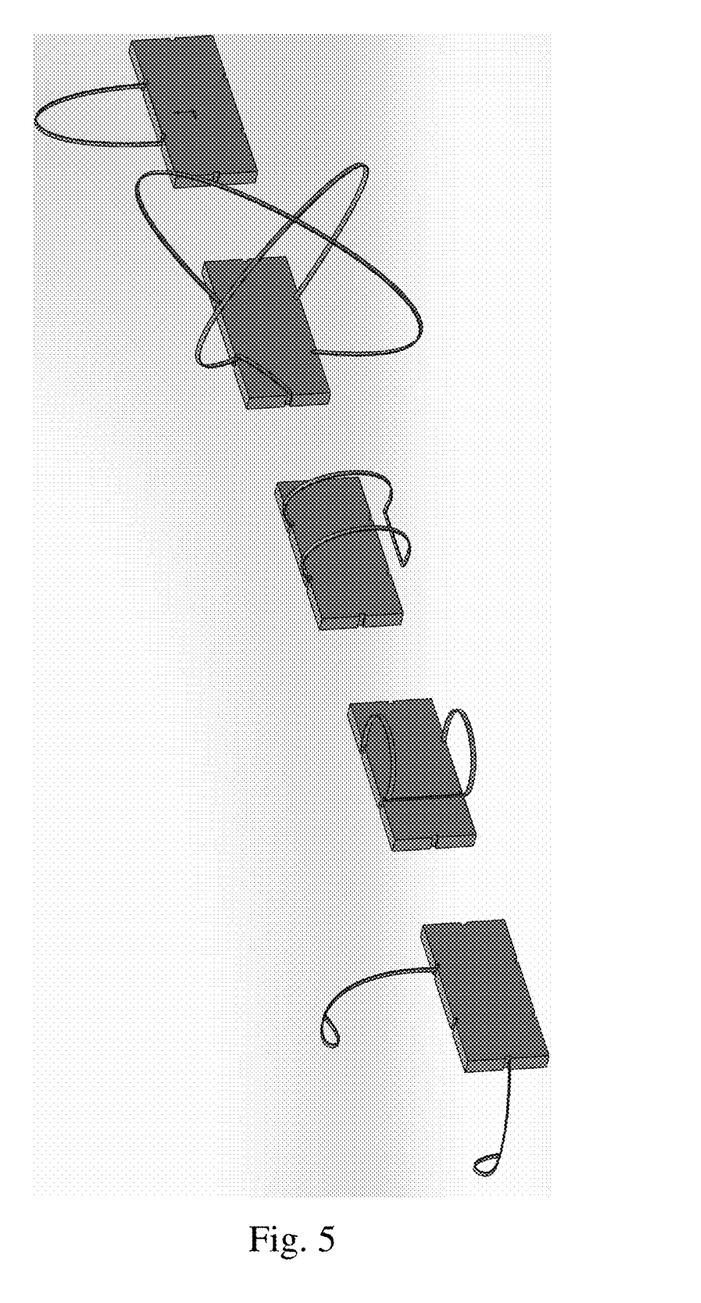
FIG. 5 is a diagram showing different loop configurations on a mobile phone case according to an exemplary embodiment.

In a further exemplary embodiment as shown in FIG. 4, the anchor points 120 at the outer edge of the case 100 also can serve as carabiners. For example, each anchor point may have a concave opening with its own carabiner shaft/gate being spring loaded. By linking the end of the charging cable 102 or the audio cable 108 to any anchor point, a loop is formed which can be used to tie or coil around objects such as arm, neck, waist, chest, etc. Further, different loop configurations can be achieved by combining the cord with multiple anchor points, as shown in exemplary FIG. 5. Thus, based on various desired orientations of the charging cable 102 and the audio cable 108 of the case 100, a user may secure the case 100 to their body or any other location in desired fashions. For example, a user could secure the case 100 around their chest so that a smartphone housed therein could act as a body camera. Alternatively, the case 100 could be secured around the arm or wrist of a user to secure a smart phone while a user is exercising. Additionally, the cables could be utilized to form a lanyard simply to hold the case 100 around an arm, wrist, hand, or neck of a user. FIG. 5 provides just some of many possible arrangements and orientations of charging cable 102 and audio cable 108 with respect to case 100 that could provide security, convenience or other desired benefits to a user.

Additionally or alternatively, as the mobile phone provides more value-added functions, such as multimedia playing, the earphones are increasingly used by mobile phone users, for example, to listen to music or to provide audio related to a video being watched. Thus, the convenience of full time access to earphones is a benefit to users. To this end, an exemplary earphone 600 is designed to be used together with the mobile phone case 100 as illustrated in exemplary FIG. 6.

Figure 6:
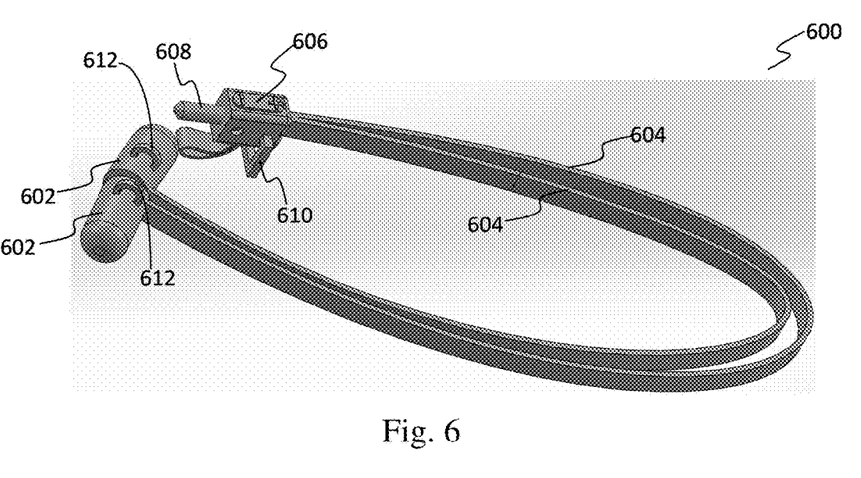
FIG. 6 is a diagram showing an earphone according to an exemplary embodiment.

In the exemplary embodiment as shown, the earphone 600 may have a pair of earbuds 602, which are located at respective one end of a pair of earbud cables 604. The other ends of the earbud cables 604 may be connected to the male audio jack connector 608 through a volume control base 606. A loop 612 can be mounted to each of the pair of earbuds 602. A latch mechanism 610 such as a carabiner can be mounted to the volume control base 606. The loops 612 can attach to the latch mechanism 610 such that the length of the earbud cables 604 is folded. Alternatively, when the earphone 600 is not used, the earbud cables 604 can combine with the anchor points 102 on the case 100. In this way, the earphone 600 can be fastened and stowed away efficiently in an orientation that is discrete enough to prevent misplaced bulk or dangling interference of the earbuds with the users.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An apparatus of a mobile phone case comprising:
a case that covers a portable device;
at least one cable that is stored within the case and retracted outward through at least one opening of the case; and
a plurality of anchor points that are provided on outer edges of the case,
wherein a first end of the at least one cable is connected to the portable device when the portable device is loaded into the case,
wherein at least one of an electricity and an electrical signal is transferred via the at least one cable,
wherein the at least one cable is linked on the plurality of anchor points forming a loop of the at least one cable, and
wherein a charging and data transferring cable and an audio cable are stored in the case and retracted outward the case by using two winches that are provided inside the case, a user of the case controls each length of the charging and data transferring cable and the audio cable that are retracted outward the case by spinning each gear of the two winches that protrude from the case.

2. The apparatus of claim 1, wherein a male universal serial bus (USB) connector is provided at a second end of the at least one cable.

3. The apparatus of claim 1, wherein a female audio jack connector is provided at a second end of the at least one cable.

4. The apparatus of claim 1, wherein a volume controller is provided at a second end of the at least one cable.

5. The apparatus of claim 1, wherein an electrical wall outlet adapter is provided at the case, the electrical wall outlet adapter is detachable from the case, and the electrical wall outlet adapter is connected to the portable device when the portable device is loaded into the case.

6. The apparatus of claim 1, wherein at least one window is provided on the case for at least one of a camera and a display of the portable device.

7. The apparatus of claim 1, wherein the at least one cable is stored in the case by using a winch that is provided inside the case, a user of the case controls the length of the at least one cable that is retracted outward the case by spinning a gear of the winch that protrudes from the case.

8. The apparatus of claim 7, wherein a ratcheting pawl located adjacent to the gear is engaged or disengaged to the gear.

9. The apparatus of claim 7, wherein the winch is operated by a motorized gear.

10. The apparatus of claim 1, wherein two ratcheting pawls are provided for the two winches, and each ratcheting pawl provided adjacent to each gear of each winch is engaged or disengaged to each gear.

11. The apparatus of claim 1, wherein the two winches are operated by a motorized gear.

12. The apparatus of claim 1, wherein each anchor point has a carabiner, and the at least one cable is linked on the plurality of anchor points via the carabiner forming a loop of the at least one cable.

13. The apparatus of claim 1, wherein at least one carabiner that is provided at a second end of the at least one cable is attachable to the anchor point of the case.

14. The apparatus of claim 1, wherein the at least one cable is at least one of a flat wire, a round wire or a half-round wire.

15. An apparatus of a mobile phone case comprising:
a case that covers a portable device;
at least one cable that is stored within the case and retracted outward through at least one opening of the case; and
a plurality of anchor points that are provided on outer edges of the case,
wherein a first end of the at least one cable is connected to the portable device when the portable device is loaded into the case,
wherein at least one of an electricity and an electrical signal is transferred via the at least one cable,
wherein the at least one cable is linked on the plurality of anchor points forming a loop of the at least one cable,
wherein the at least one cable is stored in the case by using a winch that is provided inside the case, a user of the case controls the length of the at least one cable that is retracted outward the case by spinning a gear of the winch that protrudes from the case, and
wherein the winch is operated by a motorized gear.

* * * * *